(12) United States Patent
Gateau

(10) Patent No.: US 9,001,157 B2
(45) Date of Patent: Apr. 7, 2015

(54) TECHNIQUES FOR DISPLAYING A SELECTION MARQUEE IN STEREOGRAPHIC CONTENT

(75) Inventor: Samuel Gateau, San Francisco, CA (US)

(73) Assignee: Nvidia Corporation, Santa Clara, CA (US)

(*) Notice: Subject to any disclaimer, the term of this patent is extended or adjusted under 35 U.S.C. 154(b) by 482 days.

(21) Appl. No.: 12/732,149

(22) Filed: Mar. 25, 2010

(65) Prior Publication Data

US 2010/0245356 A1 Sep. 30, 2010

Related U.S. Application Data

(60) Provisional application No. 61/163,374, filed on Mar. 25, 2009.

(51) Int. Cl.
G06T 15/20 (2011.01)
H04N 13/02 (2006.01)

(52) U.S. Cl.
CPC ................. *H04N 13/0278* (2013.01)

(58) Field of Classification Search
CPC .................................. H04N 13/0278
USPC ................ 348/40–62; 702/152; 345/419, 653
See application file for complete search history.

(56) References Cited

U.S. PATENT DOCUMENTS

| | | | | |
|---|---|---|---|---|
| 4,862,392 A * | 8/1989 | Steiner | | 345/427 |
| 5,694,532 A * | 12/1997 | Carey et al. | | 345/419 |
| 5,821,925 A * | 10/1998 | Carey et al. | | 715/757 |
| 6,311,141 B1 * | 10/2001 | Hazra | | 702/150 |
| 6,927,768 B2 * | 8/2005 | Thompson | | 345/419 |
| 7,215,357 B1 * | 5/2007 | Swift et al. | | 348/56 |
| 7,417,637 B1 * | 8/2008 | Donham et al. | | 345/506 |
| 7,832,869 B2 * | 11/2010 | Maximus et al. | | 353/7 |
| 7,965,304 B2 * | 6/2011 | Sakagawa et al. | | 345/633 |
| 8,161,252 B1 * | 4/2012 | Case et al. | | 711/161 |
| 2003/0090482 A1 * | 5/2003 | Rousso et al. | | 345/419 |
| 2003/0204364 A1 * | 10/2003 | Goodwin et al. | | 702/152 |
| 2006/0026533 A1 * | 2/2006 | Napoli et al. | | 715/850 |
| 2006/0036944 A1 * | 2/2006 | Wilson | | 715/702 |
| 2007/0097121 A1 * | 5/2007 | Loop et al. | | 345/428 |
| 2009/0207237 A1 * | 8/2009 | Leveco et al. | | 348/51 |
| 2012/0026396 A1 * | 2/2012 | Banavara | | 348/500 |

OTHER PUBLICATIONS

"Shutter Glasses", Wikipedia, published Jan. 11, 2006, p. 1-9, found on the internet Jun. 26, 2012 [url: http://web.archive.org/web/20060111100752/http://en.wikipedia.org/wiki/Shutter_glasses].*
"Stencil Buffer," Wikipedia, Mar. 12, 2009, p. 1.
"Shadow Volume," Wikipedia, Mar. 5, 2009, p. 1-5.
"Lc Shutter Glasses," Wikipedia, Mar. 10, 2010, p. 1-3.
"Rasterisation," Wikipedia, Mar. 8, 2010, p. 1-7.
"Stereographic Projection," Wikipedia, Dec. 30, 2008, p. 1-10.

* cited by examiner

*Primary Examiner* — Christopher S Kelley
*Assistant Examiner* — Jonathan Messmore

(57) ABSTRACT

A technique for stereographic display of a selection marquee in a scene includes receiving the selection marquee in a two-dimensional viewpoint at a near plane of the scene. A selection volume is generated from which the fragments of a scene associated with the selection marquee are determined. A two-dimensional stereoscopic representation of the three-dimensional scene, including the selection marquee at the associated fragments, may then be rendered.

20 Claims, 9 Drawing Sheets

TECHNIQUES FOR DISPLAYING A SELECTION MARQUEE IN STEREOGRAPHIC CONTENT

CROSS-REFERENCE TO RELATED APPLICATIONS

This application claims the benefit of U.S. Provisional Patent Application No. 61/163,374 filed Mar. 25, 2009.

BACKGROUND OF THE INVENTION

Conventional three dimensional rendering includes monographic and stereo graphic rendering. Monographic rendering produces a three-dimensional projection onto a two-dimensional display. Typically monographic rendering utilizes depth testing, shading, and the like to project a three-dimensional scene on a display. Currently, monographic rendering is popularly utilized in computer games.

Stereographic rendering produces a left eye and right eye two-dimensional projection of three-dimensional data, in addition to depth testing, shading and the like, to produce an image that appears to have depth in front of and behind a display device when used, for example, in combination with shutter glasses. Two images may be generated by shifting a mono view along the x axis. In one implementation, each scene is copied and shifted by a parallax value to generate a left and right eye view 110, 120 of the scene, as illustrated in FIG. 1. The left and right eye views 110, 120 are then presented on a display 140 independently to each eye of the user. In one implementation, a pair of shutter glasses 120 are used in combination with a liquid crystal display (LCD), digital light processing (DLP) display or 3D projection unit 140 to present the stereoscopic scene. The left and right eye views 110, 120 are alternatively presented on the display 140 and the left and right lens of the shutter glasses 130 synchronously turn on and off to independently present the left and right eye views 110, 120 to each respective eye of the user to create the illusion of a three dimensional image. The resulting image appears to the user to have depth in front of and behind the stereoscopic three-dimensional display.

In a number of graphical rendering applications, a selection marquee may be used to indicate a selected area in the rendered image. For example, a user may use a pointing device to draw a box for selecting a region in the image. In monographic rendering, the selection marquee is naturally defined in the view space as a two-dimensional shape (e.g., rectangle, disc, free form shape). Therefore, the selection marquee can be simply drawn as the desired shape in the window space. However, in stereographic rendering the same solution does not work. Each view defines its own selection marquee volume in its clipping space. The vertical edges of the shape don't match in the right and left images. Accordingly, there is a need for an improved technique for displaying a selection marquee in stereographic rendering.

SUMMARY OF THE INVENTION

The present technology may best be understood by referring to the following description and accompanying drawings that are used to illustrate embodiment of the present technology.

Embodiments of the present technology are directed toward techniques for displaying a selection marquee in stereographic content. In one embodiment, a selection volume is generated from a mono viewpoint projection of the selection marquee. The fragments of the three-dimensional scene inside the selection volume projection are determined, for each of a right eye view and a left eye view of the scene. The coordinates of the fragments, for each of the left eye view and the right eye view, are transformed to two-dimensional coordinates expressed in a mono viewpoint at the near plane. The fragments inside the selection volume at the two-dimensional coordinates in the near plane are shaded with a selection attribute.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 1:
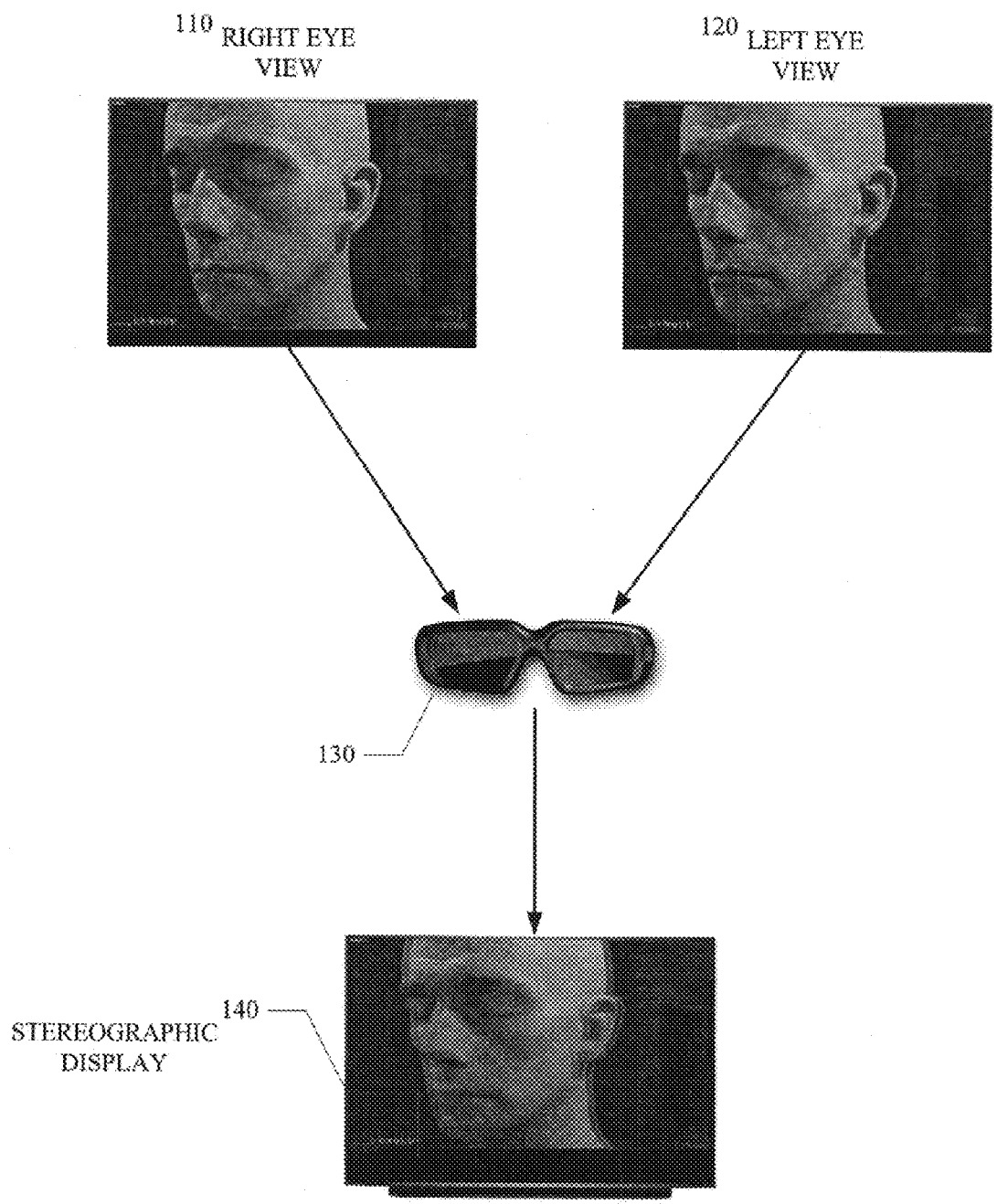
FIG. 1 illustrates a stereographic display technique.
Figure 2:
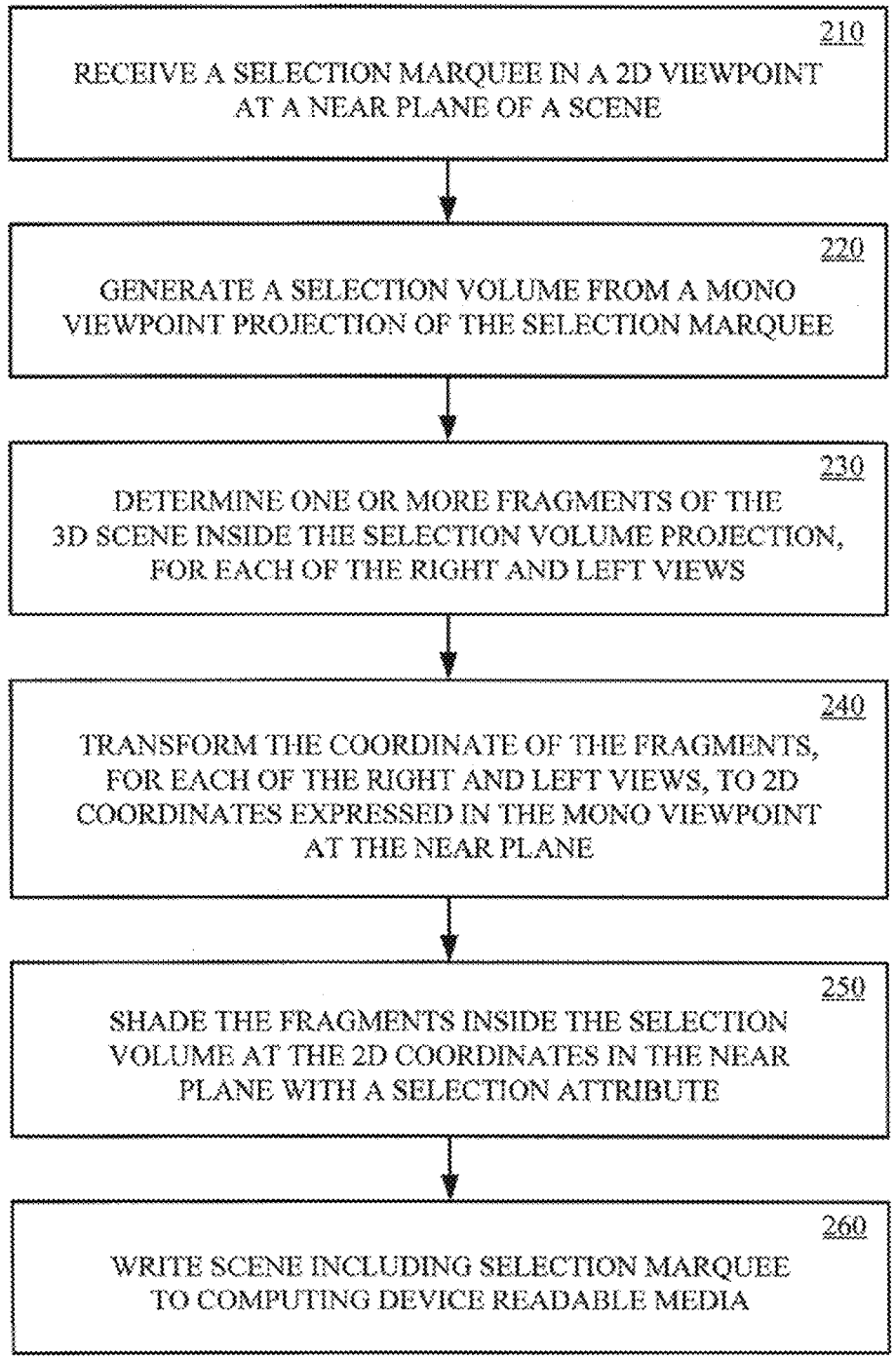
FIG. 2 shows a flow diagram of a method of displaying a selection marquee in stereographic content, in accordance with one embodiment of the present technology.
Figure 3A:
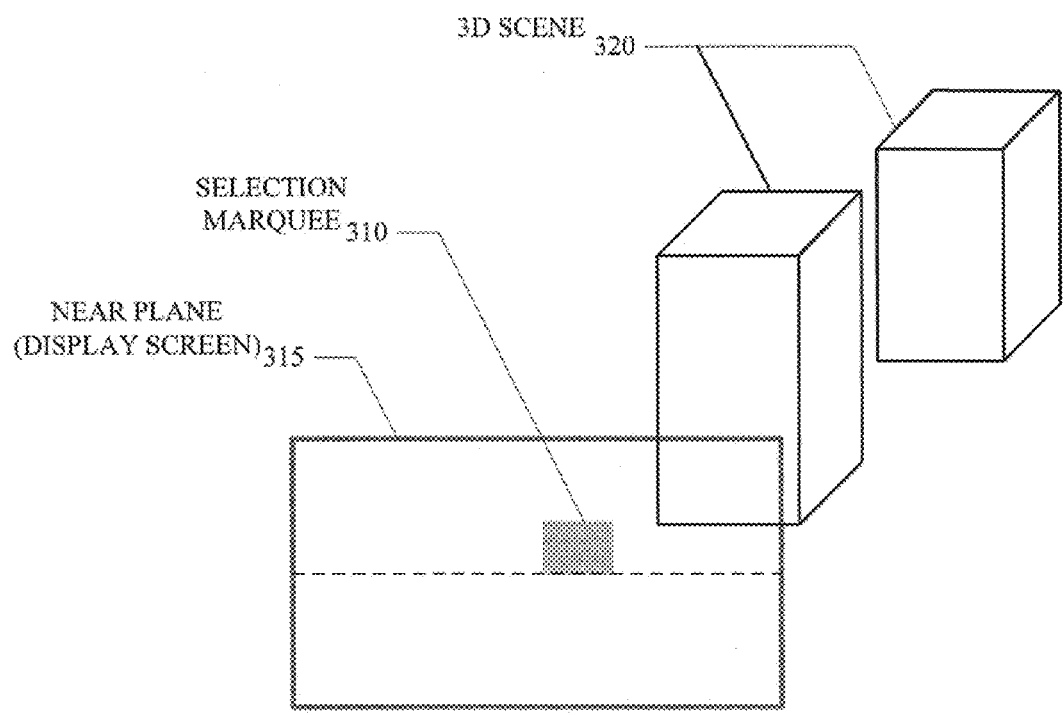
FIGS. 3A and 3B illustrate projection of a selection volume on a three-dimensional (3D) scene, in accordance with one embodiment of the present technology.

Referring now to FIG. 2, a method of displaying a selection marquee in stereographic content, in accordance with one embodiment of the present technology, is shown. The method begins with receiving a two dimensional (2D) selection marquee at a near plane (e.g., display screen) of a scene at 210. The selection marquee may be any shape, such as a rectangle, disk, lasso, or the like. In one implementation, the opposite vertex coordinates of a selection marquee rectangle are received from manipulation of a cursor on a display screen in response to corresponding manipulation of a mouse by a user. An exemplary rectangular selection marquee 310 in a two dimensional viewpoint at a near plane 315 of a scene 320 is illustrated in FIG. 3A.

Figure 3B:
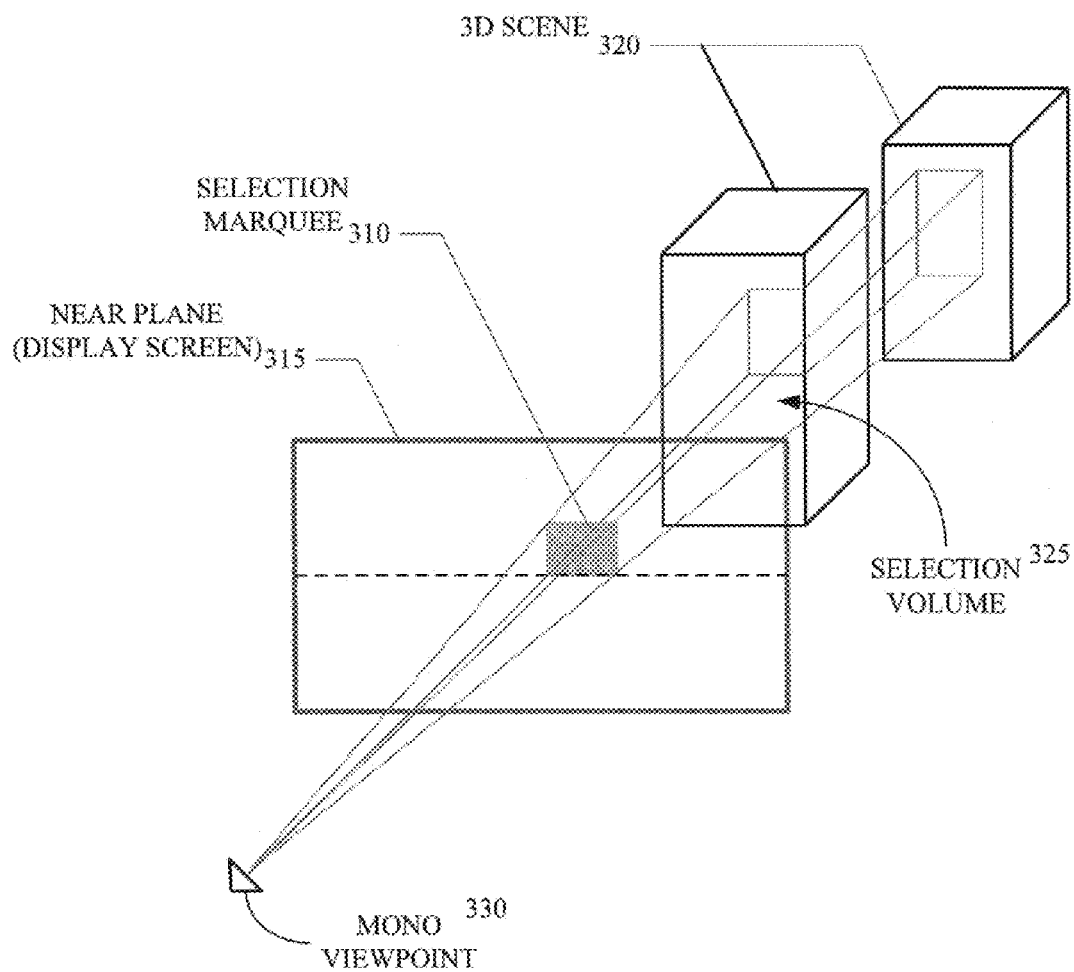

At 220, a selection volume is generated from a mono viewpoint projection of the received selection marquee. A selection volume 325 projection on the three-dimensional (3D) scene 320 is illustrated in FIG. 3B. The selection marquee 310 may be projected from the mono viewpoint 330 on to the three-dimensional scene 320 to intersect with one or more scene surfaces. In one implementation, rays are projected from the mono viewpoint 330 through the rectangular selection marquee 310 onto the three-dimensional scene 320 to create the selection volume 325.

Referring again to FIG. 2, the one or more fragments of the scene that are inside the selection volume projection are determined, at 230. In one implementation, the selection volume is depth tested (e.g., z-test) against the depth buffer of the three-dimensional scene. To perform the test, the scene may first be generated as if it were completely inside the selection marquee. A mask is constructed in a stencil buffer that has holes where the visible scene is outside the selection marquee, for each of the left and right viewpoints. When generating the mask, writes to the depth and color buffers are disabled. In addition, back-facing surfaces in the scene are culled. The stencil operation is set to increment on depth pass (e.g., only count volume projections in front of the objects in the scene). Thereafter, the selection volume projection is rendered (e.g., because of culling, only their front faces are rendered). Next, front-face culling is used and the stencil operation is set to decrement on depth pass. Thereafter, the selection volume is again rendered (e.g., only their back faces are rendered). For each of the left and right viewpoints, the scene is generated again as if it were lit, using the stencil buffer to mask the selection marquee. Thereafter, the surface within the selection volume will have an odd value in the stencil buffer (e.g., the number of front and back surfaces of the selection volume between the right and left viewpoints respectively and the scene surfaces are not equal). If the stencil value of the fragment is odd the fragment is within the selection marquee.

At 240, the three-dimensional coordinates of the scene fragment inside the selection volume, for each of the right and left views, are transformed to two-dimensional coordinates expressed in the mono viewpoint at the near plane. In one implementation, for each of the left and right views, if the stencil value is odd, the position of the three-dimensional scene fragment is looked up in a mono view space position buffer. The position is transformed back to the mono two-dimensional near plane view space.

Figure 4A:
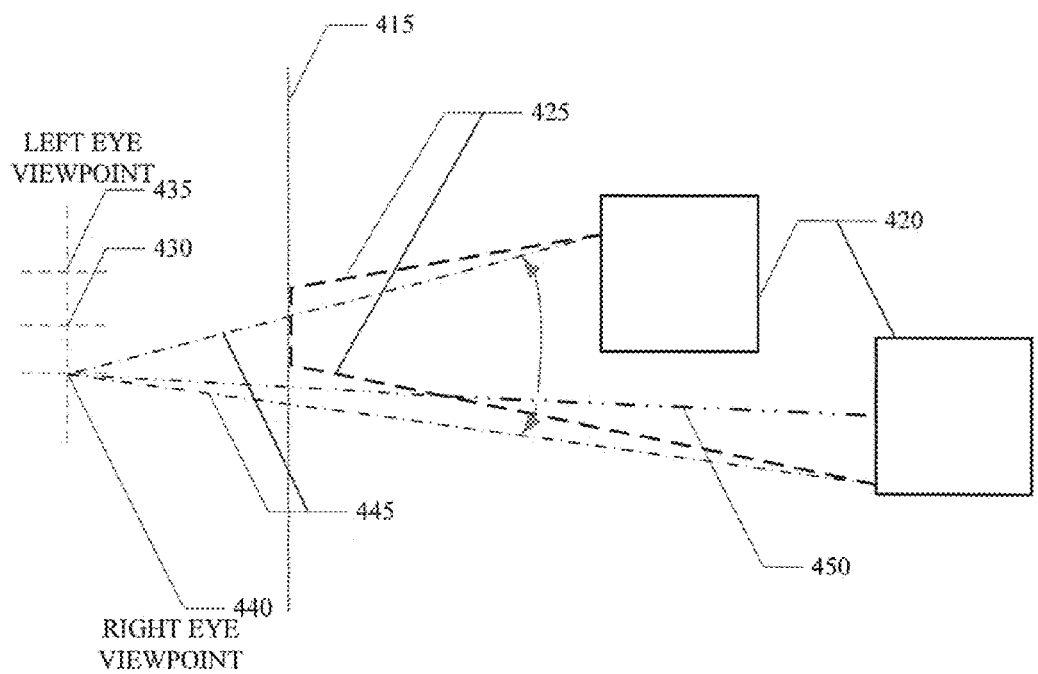
FIGS. 4A and 4B illustrate transforming three-dimensional coordinates of a scene fragment inside the selection volume to two-dimensional coordinates, in accordance with one embodiment of the present technology.
Figure 4B:
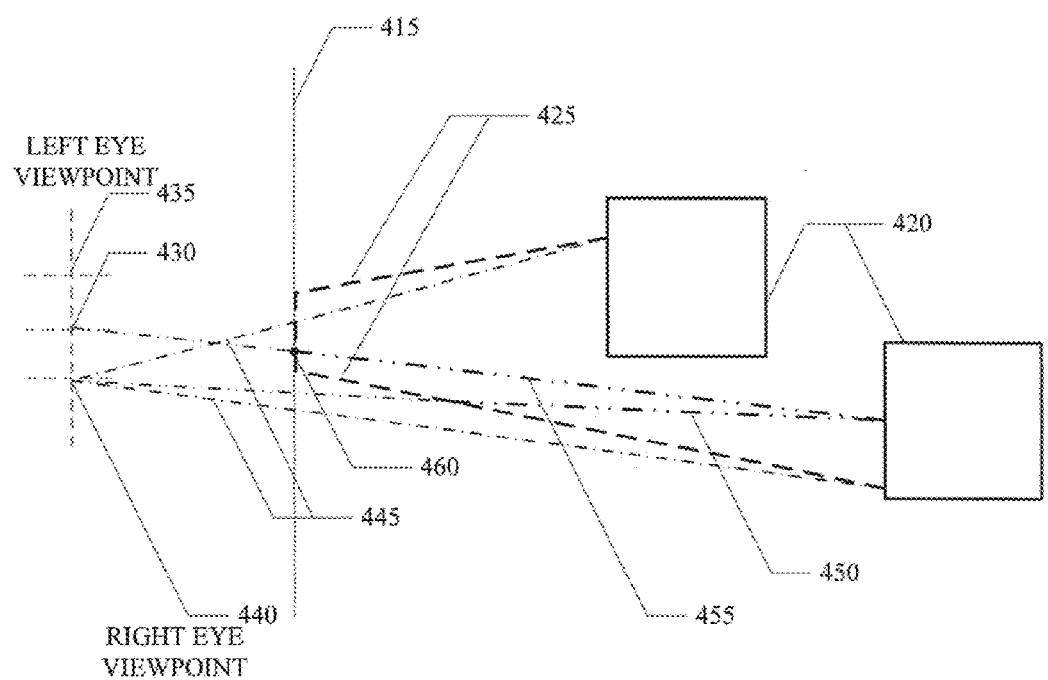

Transforming the three-dimensional coordinates of the scene fragment inside the selection volume to two-dimensional coordinates is illustrated in FIGS. 4A and 4B. In FIG. 4A, the near plane 415, the three-dimensional scene 420, the selection volume 425, the mono viewpoint 430, the left eye viewpoint 435, the right eye viewpoint 440, and the right eye frustrum 445 are shown. The right eye frustrum 445 is a projection from the right eye viewpoint 440 to the fragments in the selection marquee volume 425 at the three dimensional scene 420. For each fragment, a projection 450 from the right eye view point 440 to a given fragments inside the selection marquee volume is indicated. In FIG. 4B, a projection 455 from the given fragment inside the selection marquee volume back to the mono viewpoint 430 indicates the two dimensional coordinate 460 of the fragment at the near plane 415. If the scene fragment is on the selection volume 425 within the frustrum 430 of either the left or right eye 440 viewpoint, the view space position of the three-dimensional scene 420 is transformed back to the two-dimensional monographic space 415. The same process would also be repeated from the left eye viewpoint to the three-dimensional scene fragments and back to the two-dimensional monographic space 415.

Referring again to FIG. 2, the fragments inside the selection volume at the two-dimensional coordinates in the near plane are shaded with a given selection attribute in each respective left and right scene, at 250. In one implementation, a selection color is blended with the color of the pixels in the selection marquee. In another implementation, a selection color over write the color of pixels at the border of the selection marquee.

At 260, the left and right views of the scene, including the shaded selection marquee, are written to a computing device readable media and/or output to a user on a display. In one implementation, the left and right views of the scene are written to a frame buffer. The left and right views of the scene are then output from the frame buffer to an attached display synchronously with operation of one or more shutter glasses.

Figure 5:
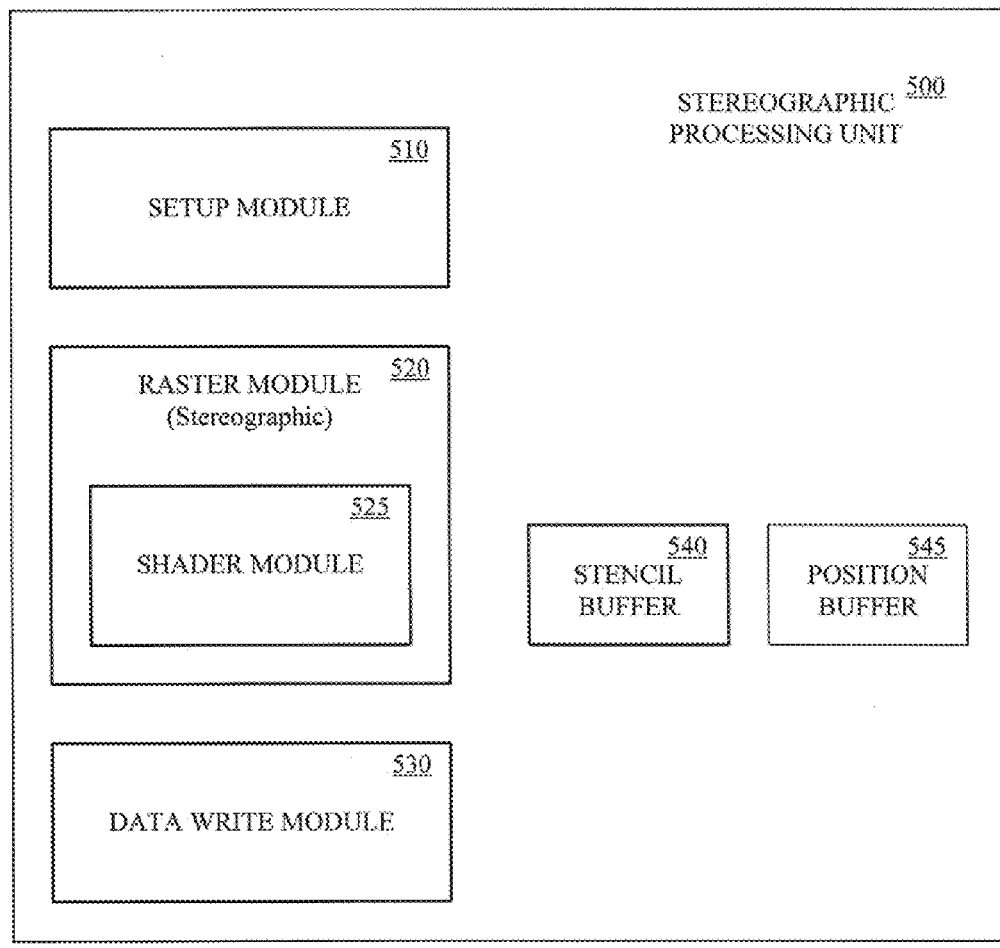
FIG. 5 shows a block diagram of a stereographic processor, in accordance with one embodiment of the present technology.

Referring now to FIG. 5, a stereographic processor, in accordance with one embodiment of the present technology, is shown. The stereographic processor may be implemented in hardware, software or a combination thereof. In one implementation, the stereographic processor may be implemented in software by a general purpose processing unit (e.g., CPU). In another implementation, the stereographic processor may be implemented in hardware, software or a combination thereof by a graphics processing unit (e.g., GPU). The operation of the stereographic processor 500 will be further explained in combination with the stereographic marquee selection techniques described above and the exemplary computing device shown in FIGS. 6 and 7.

Figure 6:
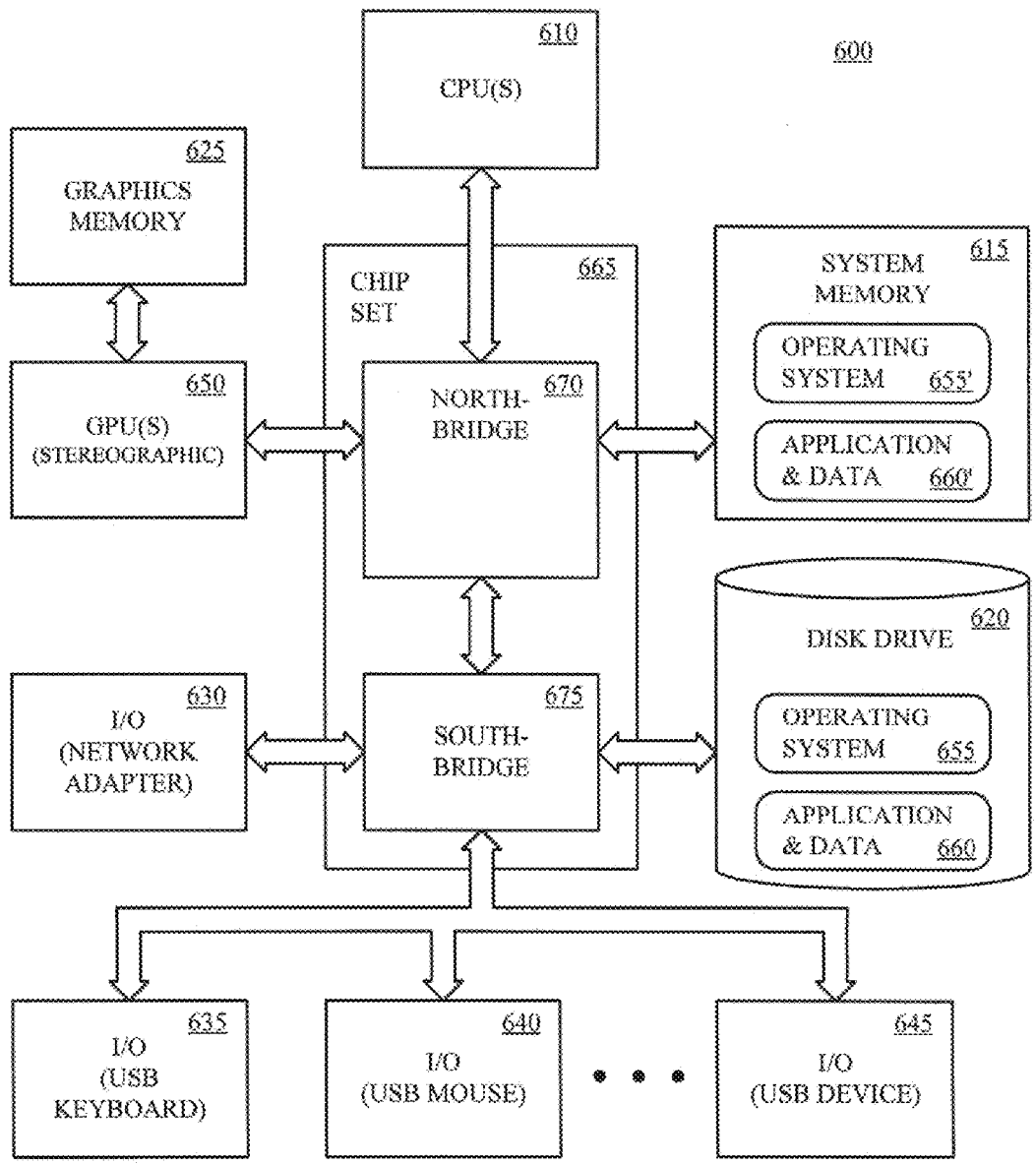
FIG. 6 shows a block diagram of an exemplary computing device, for implementing embodiments of the present technology.

Referring now to FIG. 6, the exemplary computing device 600, for implementing embodiment of the present technology, may be a personal computer, laptop computer, hand-held device, game console, personal entertainment center, media center PC, tablet PC, computer based simulator, server computer, client computer, minicomputer, mainframe computer, distributed computer system or the like. The computing device 600 includes one or more general purpose processors (e.g., CPU) 610, one or more computing device-readable media 615, 620, 625 and one or more input/output (I/O) devices 620, 630, 635, 640, 645. The I/O device 620, 630, 635, 640, 645 may include a network adapter (e.g., Ethernet card), CD drive, DVD drive and/or the like, and peripherals such as a keyboard, a pointing device, a speaker, a printer, and/or the like. The computing device 600 may also include one or more specialized processors, such as a graphics processing unit (GPU) 650.

The computing device-readable media 615, 620, 625 may be characterized as primary memory and secondary memory. Generally, the secondary memory, such as a magnetic and/or optical storage, provides for non-volatile storage of computer-readable instructions and data for use by the computing device 600. For instance, the disk drive 620 may store the operating system (OS) 655 and applications and data 660. The primary memory, such as the system memory 615 and/or graphics memory 625, provides for volatile storage of computer-readable instructions and data for use by the computing device 600. For instance, the system memory 615 may temporarily store a portion of the operating system 655' and a portion of one or more applications and associated data 660' that are currently used by the CPU 610, GPU 650 and the like.

The computing device-readable media 615, 620, 625, I/O devices 620, 630, 635, 640, 645, and GPU 650 may be communicatively coupled to the processor 610 by a chip set 665 and one or more busses. The chipset 665 acts as a simple input/output hub for communicating data and instructions between the processor 610 and the computing device-readable media 615, 620, 625, I/O devices 620, 630, 635, 640, 645, and GPU 650. In one implementation, the chipset 665 includes a northbridge 670 and a southbridge 675.

Referring again to FIG. 5, the stereographic processor 500 includes a setup module 510, a rasterizer 520 and a data write module 530. The rasterizer 520 is communicatively coupled to the setup module 510 and the data write module 530 is communicatively coupled to the rasterizer 520. The stereographic processor 500 may also include a data fetch unit, a shader, vertex buffer, a fetch cache, write buffer and/or the like. In one implementation, the shader 525 is integral to the rasterizer 520. The modules of the processor 500 are typically arranged in a pipeline architecture.

Referring now to FIG. 5 in combination with FIG. 6, in one implementation, images are off-loaded from the general purpose CPU 610 to the stereographic processor 500 (e.g., GPU 650) by transferring geometric primitive parameters, draw commands and instruction for controlling the operation of the stereo graphic processor 500. The geometric primitives may be vertex data representations of lines, triangulated three dimensional models of objects and the like. The geometric primitives, draw commands and instructions are transferred from the CPU 770 to the GPU 600 utilizing a graphics application programming interface, such as the OpenGL-ES™ graphics language, Direct3D™, or the like.

Referring now to FIG. 5, the setup module 510 receives geometric primitives, draw command and instructions. The setup module 510 prepares parameters (e.g., vertex data) of the primitives for rasterization. The setup module 510 may also perform clipping and viewpoint operations, culling of back-facing primitives and occlusion, guard-band clipping, power management for the rest of the pipeline, and/or the like.

The rasterizer receives instructions and vertex data and performs rasterization thereupon. Rasterization includes "walking" the primitive and generating pixel packets that contain parameters (e.g., set of descriptions for each pixel). The rasterizer 620 then generates a color and depth value for each pixel. After generating the color and depth value of each pixel, the rasterizer 620 duplicates each scene and applies a parallax value to generate a left eye view and right eye view. If one or more instructions and vertex data specific a selection marquee, the shader 525 generates a selection volume from the mono viewpoint projection of the selection marquee and determines one or more fragments of the three-dimensional scene inside the selection volume projection, for each of the right and left eye views, in a first pass. In a second pass, the shader 525 transforms the coordinate of the fragments, for each of the right and left eye views, to two-dimensional coordinates expressed in the mono viewpoint at the near plane and applies a selection attribute to the fragments inside the selection volume at the two-dimensional coordinates in the near plane. To perform the operation in the first and second passes of the shader 525, the stereographic processor may include a stencil buffer 540 for determining fragments in the selection marquee volume and a position buffer 545 for transforming the three-dimensional scene's fragments to the near plane.

Figure 7:
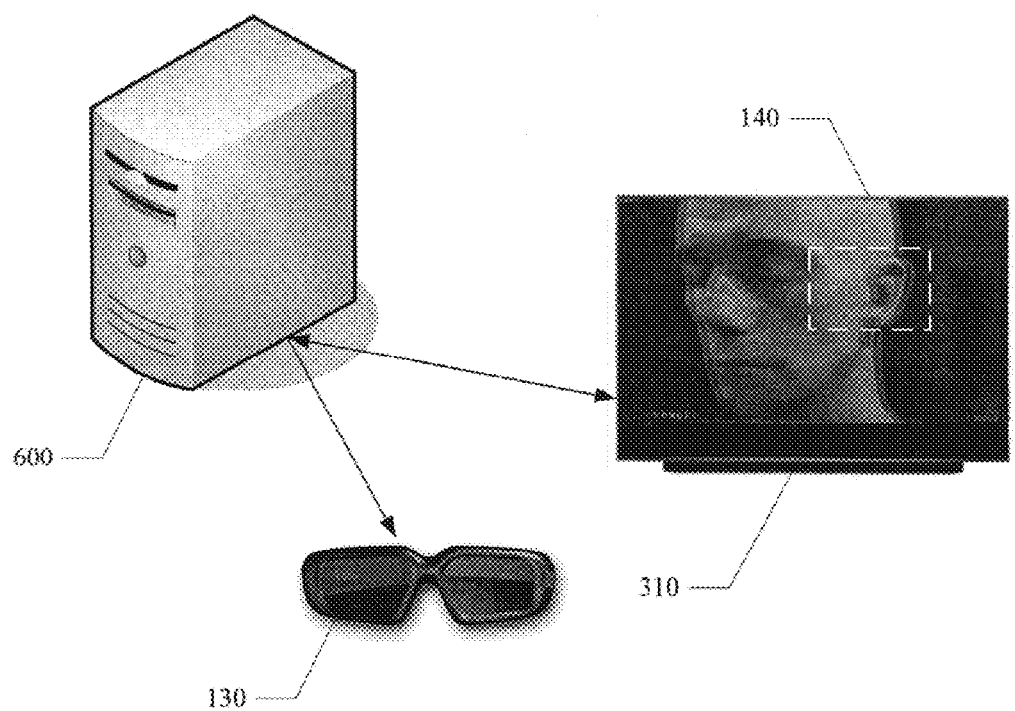
FIG. 7 shows a block diagram of an exemplary system, for implementing embodiments of the present technology.

The scenes rendered by the rasterizer 520 are passed to the data write module 530. The data write module 530 outputs the resulting pixel data to a computing device readable memory device. In one implementation, the data write module 530 writes the pixel data to a frame buffer for output to a display device. Referring now to FIG. 7, an exemplary system including a stereographic processor of a computing device 600 is shown. The computing device 600 outputs the left and right eye views on a display 140, which are presented independently to each eye of a user by a selective viewing device 130.

The selective viewing device 130 may be passive polarized glasses used in combination with a micropol display, shutter glasses with an LCD display, DLP display or 3D projection unit, or anaglyph glasses with most displays. The stereographic processor of the computing device 600 is adapted to display an accurate selection marquee 310 in the stereographic scene in response to an input from a user or application.

Embodiments of the present technology can advantageously be used to render any two-dimensional selection marquee. Rendering the selection marquee may be performed by generating the corresponding selection volume. Embodiments provide an accurate solution to represent the selection marquee in stereo. The technique utilizes an extra buffer containing the position of the view space of the three-dimensional scene fragments.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving a selection marquee m a two-dimensional viewpoint at a near plane of a three-dimensional scene;
   generating a selection volume of the selection marquee from a mono viewpoint projection of the received selection marquee in the two-dimensional viewpoint at the near plane onto the three-dimensional scene;
   determining one or more fragments of the three-dimensional scene corresponding to the generated selection volume for each of a right eye viewpoint and a left eye viewpoint; and
   rendering a two-dimensional stereoscopic representation, including the selection marquee at the one or more determined fragments, of the three-dimensional scene, wherein the two-dimensional stereoscopic representation is rendered using a parallax value.

2. The method according to claim 1, wherein the selection marquee in the two-dimensional viewpoint at a near plane of the scene is received in response to a user input.

3. The method according to claim 1, wherein generating the selection volume of the selection marquee further comprises generating the selection volume from a mono viewpoint projection of the selection marquee.

4. The method according to claim 3, wherein determining one or more fragments of the three-dimensional scene corresponding to the selection volume comprises determining one or more fragments of the three-dimensional scene inside the selection volume projection, for each of the right eye viewpoint and the left eye viewpoint.

5. The method according to claim 4, wherein determining one or more fragments of the three-dimensional scene inside the selection volume projection comprises stencil buffer depth testing, the three-dimensional scene inside the selection volume projection.

6. The method according to claim 4, wherein rendering the two-dimensional stereoscopic representation, including the selection marquee at the one or more fragments, of the three-dimensional scene comprises:
- transforming coordinates of the one or more fragments, for each of the right eye viewpoint and left eye viewpoint, to two-dimensional coordinates expressed in the mono viewpoint at the near plane; and
- shading the one or more fragments inside the selection volume at the two-dimensional coordinates in the near plane with a selection attribute.

7. The method according to claim 6, wherein transforming coordinates of the one or more fragments to two-dimensional coordinates expressed in the mono viewpoint at the near plane comprises fetching a position of the one or more fragments in a view space position buffer and transforming the fetched position to the two-dimensional coordinates expressed in the mono viewpoint at the near plane.

8. The Method according to claim 7, Wherein transforming the fetched position comprises projecting the fetched position back. to the mono viewpoint.

9. The method according to claim 6, further comprising writing the two-dimensional stereoscopic representation, including the selection marquee at the one or more shaded fragments, to a computing device readable media.

10. The method according to claim 9, further comprising presenting the left eye view and right eye view of the two-dimensional stereoscopic representation, including the selection marquee at the one or more shaded fragments, on a display to each respective eye of a user.

11. A system comprising:
- a stereographic processor to;
  - receive a selection marquee in a two-dimensional viewpoint at a near plane of a three-dimensional scene;
  - generate a selection volume from a mono viewpoint projection of the selection marquee in the two-dimensional viewpoint onto the three-dimensional scene;
  - determine one or more fragments of the three-dimensional scene inside the selection volume projection, for each of a right eye view and a left eye view;
  - transform the coordinates of the fragments, for each of the left eye view and the right eye view, to two-dimensional coordinates expressed in the mono viewpoint at the near plane; and
  - shade the fragments inside the selection volume at the two-dimensional coordinates in the near plane with a selection attribute;
- a display to output a stereoscopic two-dimensional representation based on a parallax value of the scene including the shaded fragments; and
- a selective viewing device to sequentially present the left eye view and the right eye view of the stereoscopic two-dimensional representation of the scene.

12. The system of claim 11, wherein the stereographic processor comprises a shader to generate the selection volume and determine the one or more fragments inside the selection volume in a first pass.

13. The system of claim 12, wherein the shader transforms the coordinate of the fragments to two dimensional coordinates in the near plane in a second pass.

14. The system of claim 13, wherein the display is selected from a group consisting of a liquid crystal display (LCD), a digital light processing (DTP) display, a 3D projection unit, a television, a plasma television, a monitor, a micropol display, and a cathode ray tub (CRT).

15. The system of claim 13, wherein the selective viewing device is selected from a group consisting of shutter glasses, passive polarized glasses and anaglyph glasses.

16. One or more non-transitory computing device readable media having computing device executable instructions which when executed by one or more processors perform a method comprising:
- receiving a selection marquee in a two-dimensional viewpoint at a near plane of a three-dimensional scene;
- generating a selection volume from a mono viewpoint projection of the selection marquee onto the three-dimensional scene;
- determining one or more fragments of the three-dimensional scene inside the selection volume projection, for each of a right eye view and a left eye view;
- transforming the coordinates of the fragments, for each of the left eye view and the right eye view, to two-dimensional coordinates expressed in the mono viewpoint at the near plane; and
- shading the fragments inside the selection volume at the two-dimensional coordinates in the near plane with a selection attribute.

17. The one or more non-transitory computing device readable media having computing device executable instructions which when executed by one or more processors perform the method of claim 16, further comprising writing a two-dimensional stereoscopic representation, including the selection marquee at the one or more shaded fragments, of the scene to a frame buffer.

18. The one or more non-transitory computing, device readable media having computing device executable instructions which when executed by one or more processors perform the method of claim 16, further comprising receiving the selection marquee in response to a user input.

19. The one or more non-transitory computing device readable media having computing device executable instructions which when executed by one or more processors perform the method of claim 16, further comprising outputting a two-dimensional stereoscopic representation, including the selection marquee at the one or more shaded fragments, of the scene.

20. The one or more non-transitory computing device readable media having computing device executable instructions which when executed by one or more processors perform the method of claim 16, further comprising sequentially presenting a left eye view and a right eye view of a two-dimensional stereoscopic representation, including the selection marquee at the one or more shaded fragments, of the scene to a respective left eye and right eye of a user.

* * * * *